Sept. 2, 1947.    L. M. POTTS    2,426,947
CAMERA FOR PHOTOGRAPHING METER READINGS AND THE LIKE
Original Filed Jan. 7, 1938    4 Sheets-Sheet 1
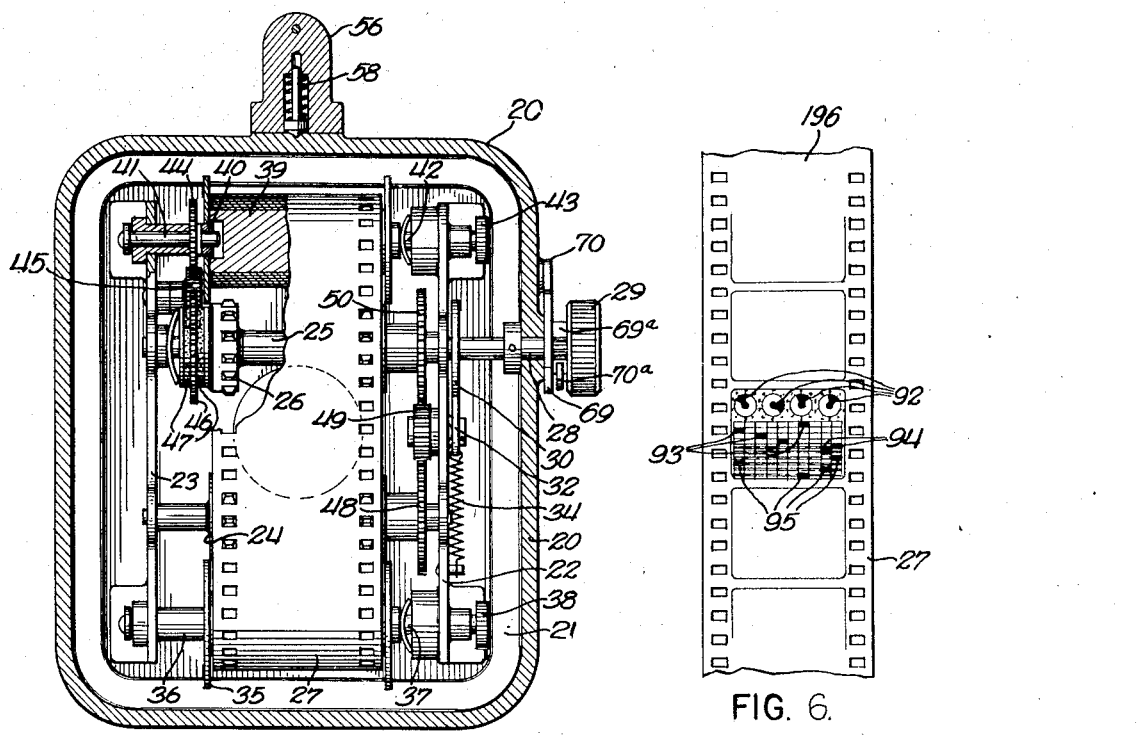
FIG. 5.
FIG. 6.
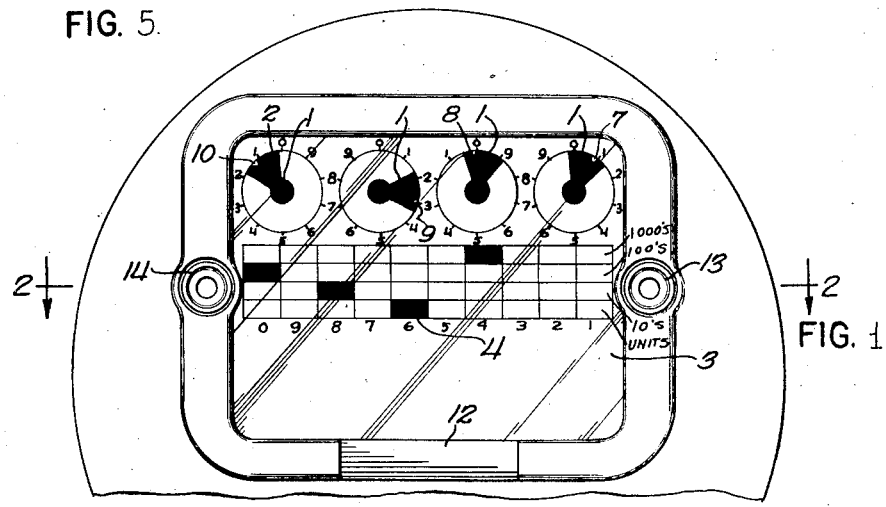
FIG. 1
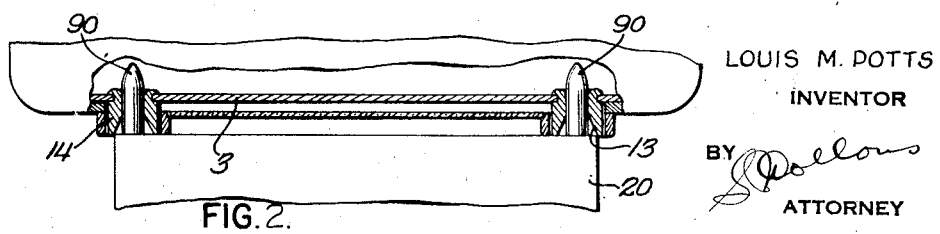
FIG. 2.
LOUIS M. POTTS
INVENTOR
BY
ATTORNEY Sept. 2, 1947.  L. M. POTTS  2,426,947
CAMERA FOR PHOTOGRAPHING METER READINGS AND THE LIKE
Original Filed Jan. 7, 1938   4 Sheets-Sheet 2

LOUIS M. POTTS
INVENTOR

BY
ATTORNEY

Sept. 2, 1947. L. M. POTTS 2,426,947
CAMERA FOR PHOTOGRAPHING METER READINGS AND THE LIKE
Original Filed Jan. 7, 1938 4 Sheets-Sheet 3

LOUIS M. POTTS
INVENTOR

BY

ATTORNEY

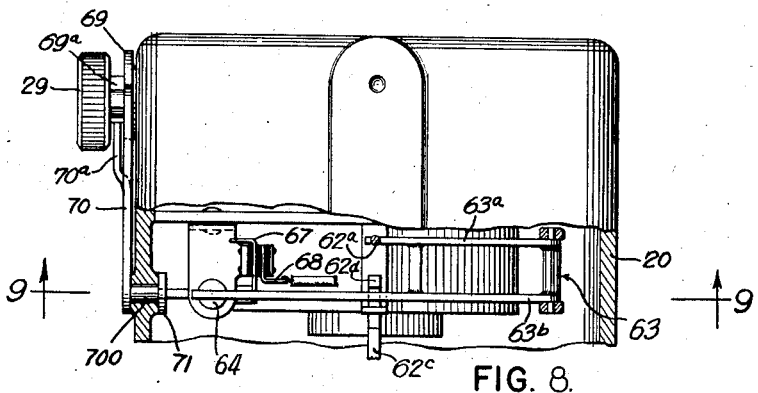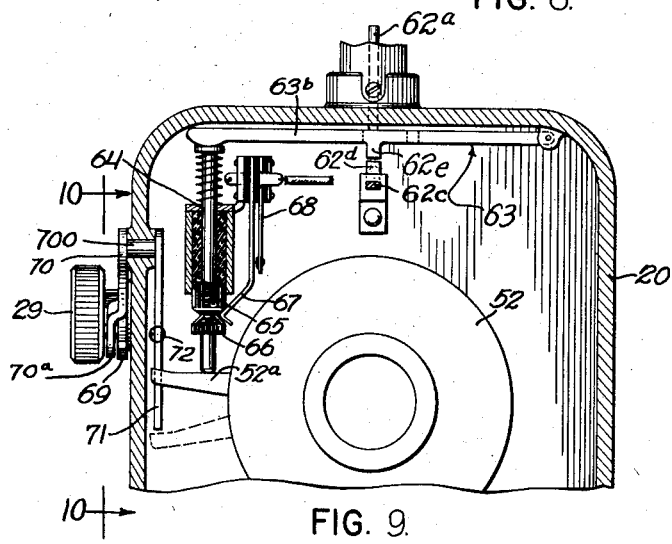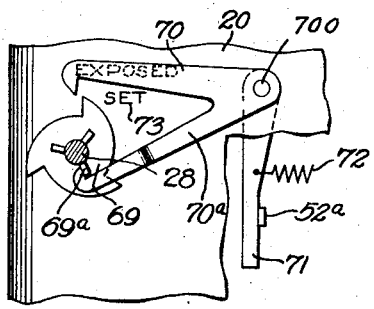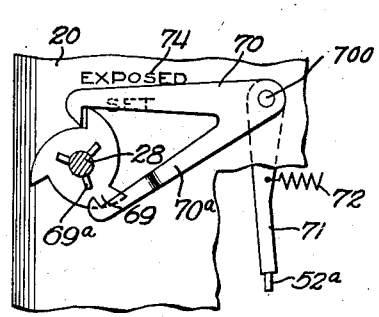

Patented Sept. 2, 1947

2,426,947

UNITED STATES PATENT OFFICE 2,426,947

CAMERA FOR PHOTOGRAPHING METER READINGS AND THE LIKE

Louis M. Potts, Evanston, Ill.; Martha W. C. Potts executrix of Louis M. Potts, deceased Original application January 7, 1938, Serial No. 183,861. Divided and this application February 22, 1943, Serial No. 476,676

10 Claims. (Cl. 234—58)

The present invention relates to a system of meter reading and particularly to apparatus for reproducing upon a photographic film meter recordings which comprise images of dial faces of integrating meters that denote the quantity of consumption of electricity, gas, or other public service commodities.

This application is a division of the subject matter contained in U. S. patent application Serial No. 183,861, filed January 7, 1938, now Pat. No. 2,313,088, March 9, 1943, relating to a meter recording system.

In systems of automatic accounting and billing use is made of perforated cards in which the arrangement of the perforations may represent information concerning a customer's identity and his commodity consumption. This information is customarily obtained from the individual commodity meter by manually transcribing meter readings, then preparing this information by perforating, with a keyboard machine, different items relating to the customer's identity and commodity consumption. This practice admits of human error which may enter in making an improper observation as well as in mentally transposing the observations to a temporary record card. The amount of time consumed in making each observation when multiplied by the number of such observations in the daily routine of a meter reader constitutes a noteworthy time expenditure which considerably affects the volume of work that may be produced.

It is, accordingly, a principal object of this invention to provide a method of photographically reproducing the instant image of a commodity recording meter by a single manipulative operation whereby there is obtained, in a portable yet totally reliable manner, an exact image of all of the recording dials upon a medium which itself may thereafter be employed directly in the purpose of automatically supervising accounting and billing apparatus of the type disclosed in the above-referred to copending application.

In the attainment of this and other objects of the present invention, there is provided a portable unitary apparatus equipped with alignment fixtures to assure its proper placement with respect to each one of a large number of commodity recording meters for reproducing the image not only of the meters' registering dials but also that of its individual identification number, the date on which the record is taken and an identification of the operator's camera. Moreover, safeguards are provided to assure against operation of the photographic release trigger unless the camera and meter are brought into proper registration.

In meter reading devices it has become conventional to employ dial indicators in which each dial represents a numerical integer, so that several dials indicate numerically a quantity reading. Moreover, in accordance with well-known conventions, the dials are continuously geared so that a unit revolution of one manifests itself by a proportional rotation of its adjacent one sequentially. As a result of this practice, the indicator of each dial displays by a proportionate increment the partial movements of its adjacent dial. Contrasting with this practice, calculating and accounting machines are provided with integer elements whose movement is intermittent and is responsive to the movement of its adjacent dial only after the latter has consummated a predetermined amount of its movement, usually a single revolution. In attempting to reconcile the former described principle of operation to the use of the conventional practice in calculating and accounting machines, there may be encountered frequently certain marginal conditions at which a reading may find certain ones of the indicators critically divided between two possibilities. To an inspector, the true reading is conveyed by imputation; that is, the indication of the lesser numerical integer will inform him how to construe its adjacent and higher indicator.

In carrying out the incidents and practices of the present invention there is contemplated the use of a portable camera which is to be carried by the inspector during his tour of inspection. The camera is applied to the meter in accordance with an alignment safeguard, and the reading is executed by the pulling of a trigger, which causes a camera shutter to open momentarily, recording upon a small frame of film the reading on the face of the meter, the identification number of the meter, etc., and preferably too, the identification number of the camera, which is discernible by a number assigned to each inspector individually. Other items of information which might be incorporated may be provided for by adding to the number of indicating elements presented before the camera. Such changes are deemed to be merely matters of arrangement. The film is preferably comprised of a continuous roll, such as motion picture film, and the frames are automatically advanced as each record impression is obtained.

At a central office, numbers of such films may be assembled and introduced into a photo-electric scanning device. A signal storage and translating device, and a card perforating device, which may be variations of well-known apparatus adapted to the use of certain features taught by the present invention, are controlled by said films, after they have been developed and fixed. The film is fed progressively, displaying its miniature records in succession before a scanning area where its image is projected upon a photo-electric element. Thereat during the translation there is incorporated the afore-mentioned cumulative dial correction, following which impulses are stored in a storage device. A card perforating mechanism produces a card having a distribution of perforations corresponding to the storage reading; and, in accordance with mechanisms which are well known in the art, these cards are employed in the control and supervision of diverse calculating and billing machines.

A more detailed description of the several devices employed in carrying out the present invention will be set forth hereinafter in connection with the accompanying drawings, in which like reference characters represent corresponding parts throughout, and in which;

Fig. 1 is an elevational view of a meter face which shows an arbitrary arrangement of indices to illustrate the application of the present invention thereto;

Fig. 2 is a sectional view taken approximately on line 2—2 of Fig. 1 with the meter reading camera applied thereto;

Fig. 5 is a transverse sectional view taken approximately on line 5—5 of Fig. 3;

Fig. 6 illustrates a fragment of film record in which but one of the record frames has been illustrated as fully developed;

Fig. 8 is a plan view of the end of the camera looking in a direction reverse to that of Fig. 3 and having part of the camera case and pistol grip broken away;

Fig. 9 is a partial section of the camera and is taken approximately on line 9—9 of Fig. 8 featuring the shutter operating mechanism;

Fig. 10 is a fragmentary sectional view taken approximately on line 10—10 of Fig. 9, showing the reset mechanism in so-called set position; and Fig. 11 is a fragmentary sectional view similar to Fig. 10, but showing the reset mechanism in so-called released position.

Figures 3, 7:
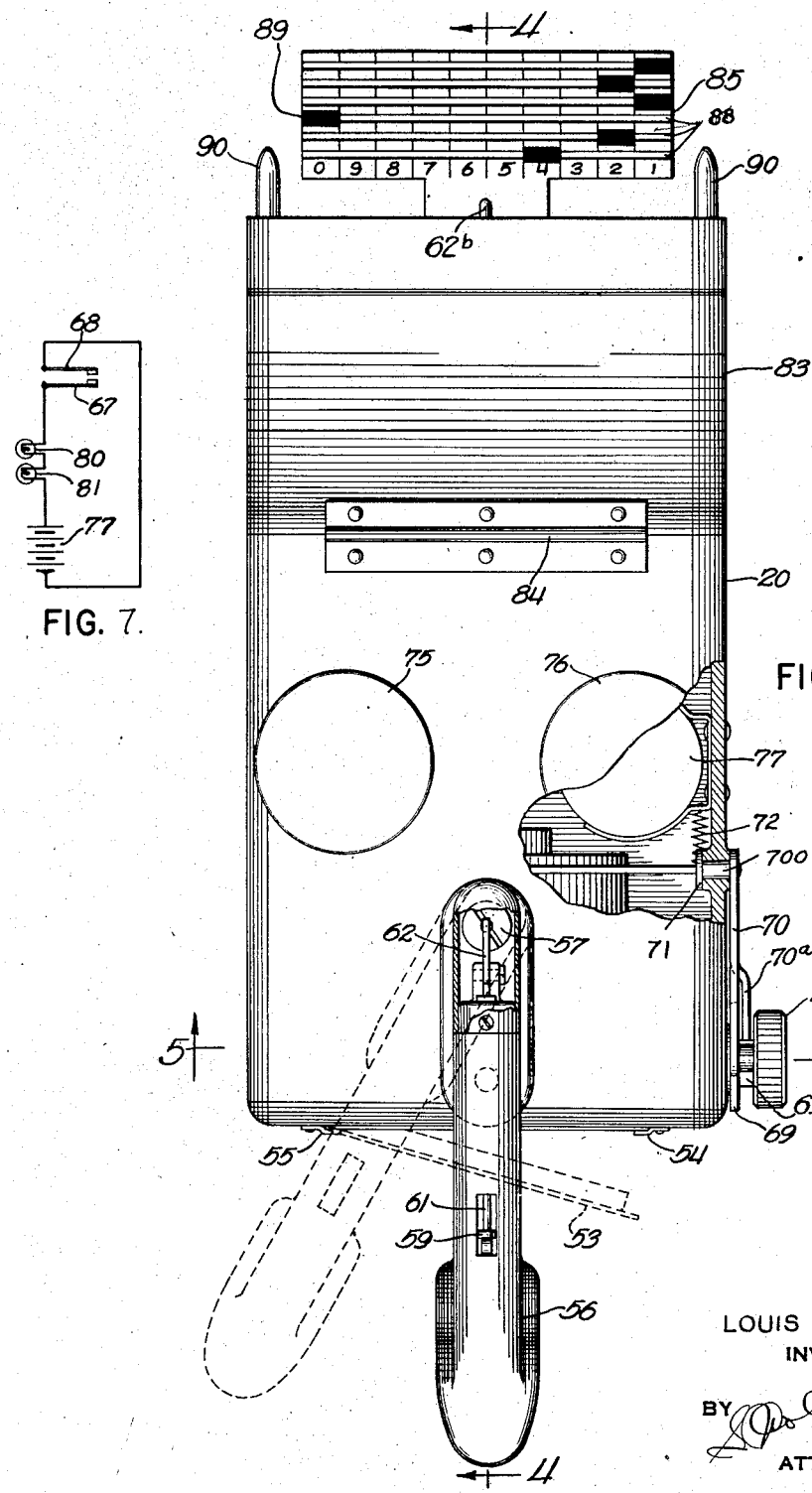
Fig. 3 is a plan view of the camera unit with portions thereof broken away.
Fig. 7 is a wiring diagram of a lighting system used for making the exposures.

In the illustration of Figs. 1 and 2, there is featured a conventional type of service meter adapted for use with a system of meter reading featured in the present embodiment. The indicator pointers 1 are illustrated as having enlarged or fan-shaped terminals 2 for the purpose of having a greater margin of safety.

A rectangular space on the dial face is divided into four rows, each of which is transversely subdivided into ten spaces, as may be seen clearly in Fig. 1. The dial face plate 3 may be provided with a series of blackened marks 4 individually arranged to represent the digits of an identification number or other characteristic of the particular station meter, or, if desired, it may represent any other collateral information. As contemplated, the upper divided row is assigned to a thousands digit of the identification number and the particular digit may be determined by the transverse position of the blackened mark reading in sequence from right to left. In a similar manner, the second row corresponds to the hundreds digit, the third to the tens digit, and the fourth to the units digit. In accordance with the arbitrary illustration, the particular meter number is 4086.

Marks 7, 8, 9, and 10 may be provided on each pointer 1 for affording a direct reading index. This mark will occur in the correct circumferential position on the large end 2 of the pointers so that the direct reading thereof will correspond to the photo-electric translated reading. This mark may occur in any angular position upon the indicator in accordance with the arrangement of the particular scanner. When a fan pointer 1 approaches a position where it may span the area from one numerical position to an adjacent one, the two numbers will be recorded upon the film. The translating device provides a means for distinguishing between two such numbers the particular one whose reading is consistent with that of its adjacent indicator next lower in the numerical sequence.

A notch 12 occurs in the frame surrounding the meter face within which there is received a projecting portion of the camera. Two dowel sockets 13 and 14 at opposite ends of the face are adapted to receive dowel pins carried at the foremost portion of the camera for the purpose of insuring accurate alignment of the camera and meter. The dial numerals have been illustrated without the circular space occupied by the dials rather than within this space in order that the pictorial impression may feature a circular blank area bounding the adjacent sides of the fan-shaped pointer. The sharp black and white contrast on the photographic negative which is subsequently scanned for the dial reading will assure that no light may pass except in those positions occupied by the pointers. By this arrangement, no light will be permitted to pass the areas of the circular dials except those made by the indicators.

Referring now to Figs. 3 and 5, particularly, there will be noted a box or housing 20 having at one end thereof a light-tight compartment 21, within which there are disposed two side plates 22 and 23. Twin feed rolls 24 and 25 are pivotally mounted between the afore-mentioned side plates, and each of said rolls has a plurality of sprocket feed teeth 26 in the manner of conventional motion picture film sprocket wheels. Standard motion picture film may be employed for the purpose of carrying out the present invention and each picture frame may serve to accommodate a complete individual record as shown in Fig. 6. Where more intricate systems of accounting or recording may be involved, several frames may serve compositely. Feed roll 25 is carried upon a spindle shaft 28, one end of which extends through the wall of housing 20 and is thereat provided with a control knob 29. Within the case 20 the extended portion of spindle 28 has secured to it a small disc 30, Fig. 4, having spaced peripheral notches 31 into which there may be received a detent projection 33 of a jockey lever 32 as normally urged by the jockey spring 34. The spacing of notches 31 is predetermined in accordance with the dimensions of the individual picture frames so that the movement between successive notches 31 will advance accurately successive picture frame areas before the exposure position.

The unexposed film is drawn from a spool 35 carried on a shaft which is pivotally supported at its ends upon a fixed pintle 36 and a yieldable or spring-loaded pintle 37 which may be withdrawn by grasping its end knob 38 in a manner familiar in the art of photographic cameras. A take-up spool 39 is similarly supported between the end plates 22 and 23, upon a fixed pintle 41 and a yieldable pintle 42 having a small knob 43. The take-up spool 39 is not merely a tensioned idler but its pintle 41 pivotally supports a gear 44 having a dog 40 which cooperates with an opening in the spool 39. Gear 44 is driven through an idler 45 by a frictionally held driving gear 46 supported between friction slip washers 47 on shaft 28.

It may be noted that by means of the aforedescribed arrangement, at the beginning of the roll of film the feed roll 25 and take-up roller 39 should be geared to handle the same amount of film. The feed roll 25 may have a slight amount of overtravel for a safety margin, if desired. As the take-up roller 39 fills up less and less rotation will be required to handle the film since the diameter of the roll is increasing. Thus, as the knob 29 and the feed roll 25 are operated to advance the film, the film will become taut on the take-up roller 39, through the operation of the gear train 46, 45, and 49, and thereafter the friction slip washers 47 will permit a slippage of an amount which will compensate for speed differences between the take-up roller 39 and the feed roll 25. Such will continue until the knob 29 reaches a stop position. The tape feed rolls 24 and 25 are geared together through a train comprising gears 48, 49 and 50.

Within an opening in a foremost partition 51 segregating the light-tight compartment 21 from the major interior of the housing 20 there is mounted a photographic lens and shutter unit 52 whose timing and adjustment are predeterminedly set. A release arm 52a moves in one direction to actuate the shutter. The center of the lens unit aligns photographically with a limited film area betwixt the rollers 24 and 25. Behind the film and opposite the partition 51 is a cover plate 53, Fig. 3. This plate 53 constitutes a light-proof cover and is held in place by withdrawable or shiftable retaining clips 54 and 55 (see Fig. 3) to afford accessibility for film replacement.

Figure 4:
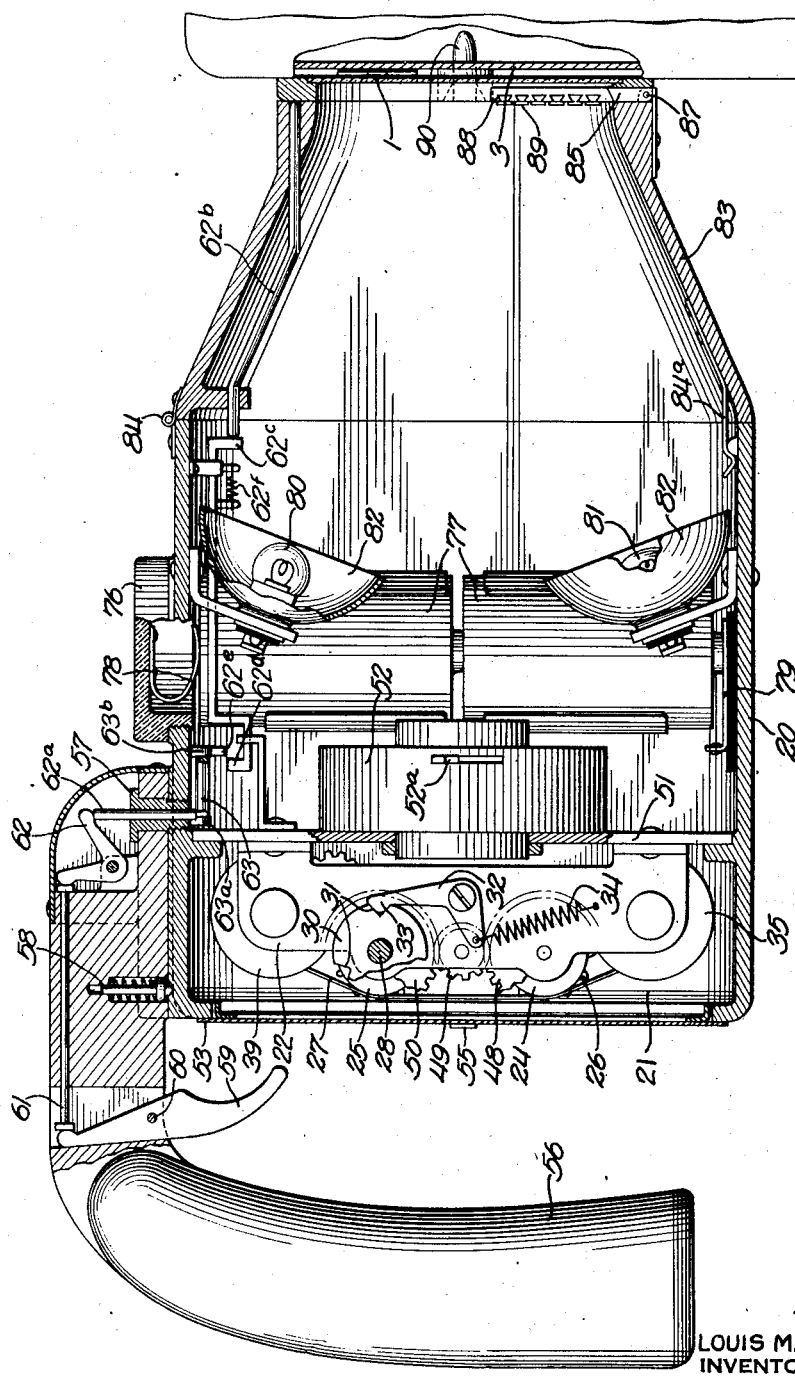
Fig. 4 is a longitudinal section taken approximately on line 4—4 of Fig. 3.

As a convenience for carrying the camera unit there is contemplated a pistol-grip handle 56 pivoted to the case 20 by a hollow shoulder screw 57, Figs. 3 and 4, and detented in an aligned position by means of a spring-loaded detent plunger 58, the nose of which is seated within a suitable depression on the surface of the frame 20. Upon overcoming the detent action of plunger 58, the handle 56 may be swung to one side as illustrated by the dotted outline in Fig. 3, making the cover plate 53 accessible. The exposure action may be controlled by means of a trigger 59 pivoted at 60 and terminating with a projection which engages an enlarged tip of a plunger 61. The opposite end of plunger 61 urges against one arm of a bell crank 62 whose other arm rests against a plunger 62a housed concentrically of the shoulder screw 57.

Referring now more particularly to Figs. 8 and 9, it will be noted that plunger 62a rests upon one arm 63a of a pivoted yoke while its companion arm 63b extends across the top of the housing and rests with its free end upon a spring-loaded plunger rod 64 whose twofold function is to control a contact pair 67—68 and to depress the shutter arm 52a afore-described. For the purpose of controlling the contact pair 67—68, plunger 64 is provided with an insulating collar 65 having an annular groove 66. An offset portion of contact spring 67 extends into the groove 66 in the unactuated position of plunger 64, but upon its depression, the enlarged side wall of groove 66 cams spring 67 into engagement with its associated contact spring 68 for a purpose to be noted hereinafter.

Adjacent knob 29 and secured to shaft 28 there may be noted a disc cam 69, Figs. 5 and 8–11, the periphery of which affords three equally spaced involute apices, and alongside which there are secured to shaft 28 three equally spaced radial vanes 69a. On the outside of housing 20 a pallet lever is pivoted at 700 having two arms, the lower one of which is indicated 70a and the upper 70. An arm 71 is secured to the shaft 700 common to said pallet lever, and a spring 72 urges the assembly in a counterclockwise direction as viewed in Figs. 10 and 11. The lowermost extremity of lever arm 71 is presented in the path of shutter release arm 52a, Fig. 9. With the shutter in its normal position as seen in Fig. 10, Spring 72 is restrained from influencing the assembly but upon the actuation of release arm 52a, moving it into the dotted outline position of Fig. 9, spring 72 is freed to rotate the assembly counterclockwise into a position such as illustrated in Fig. 11. Thereupon arm 71 overlies release arm 52a as seen in Fig. 11, preventing its return and therefore its double actuation as through inadvertence. The upper arm 70 is aligned with the apices of cam 69, but the lower arm thereof is offset to avoid cam 69 and engage the vanes 69a. Upon rotating shaft 28 to present a new film, an involute apex of cam 69 cams lever arm 70 upwardly and against the influence of spring 72. This withdraws the tip of arm 71 from the path of release arm 52a, permitting the latter to respond to the influence of its return spring (not shown) and be moved back behind arm 71 to reload the shutter. Meanwhile, the degree of movement of shaft 28 is limited when one of the vanes 69a encounters the shouldered extremity of arm 70a. Further rotation of shaft 28 must then await the reactuation of release arm 52a. In this way arm 71 provides a safeguard against the double actuation of release arm 52a while the arm 70a provides a safeguard against feeding out an excessive quantity of film. Suitable legends "Exposed" and "Set" may be provided to apprise an operator visually of the condition of the camera.

For the purpose of photographically illuminating the indicator dial there are provided a pair of flashlight bulbs 80 and 81, Fig. 4, each having a reflector 82. Current is supplied to each of the bulbs 80 and 81 from dry cells 77 which are supported in suitable clamping members and which may be inserted and removed through port openings in the case 20 normally sealed by the screw caps 75 and 76, Figs. 3 and 4. Spring-tensioned contact elements 78 and 79 engage the terminals of cells 77, effecting a circuit as illustrated in Fig. 7, the closure of which is under the supervision of the afore-described contact springs 67 and 68, Figs. 8 and 9.

The front portion of the camera is separable from the main body portion 20 and is hinged at 84 thereto. A detent spring 84a cooperating with a lug formation in the case 20 maintains the front portion 83 securely in alignment. This construction permits accessibility for cleaning and replacement of parts. A gate 85 is hinged at 87, Fig. 4, so as to be swung into and out of its normal position the latter of which is illustrated in Fig. 4.

Within dove-tail grooves 88 transversely of the gate 85 there may be slid into position colored markers 89 of size and arrangement to serve as numeral representations in a manner similar in appearance to the index marks 4 afore-mentioned in connection with the dial identification means. The markers 89 may be assigned to indicate camera identification, date, or any other information and may be changed by sliding them longitudinally to represent various integers or characters. The front face of the camera hood 83 is provided with a pair of dowel pins 90 spaced and proportioned to fit into the dowel sockets 13 and 14 provided on the meter frame (see Figs. 1 and 2).

As a safeguard against the inadvertent actuation of trigger 59 during transit or at other times when the camera has not been properly applied to a meter, there is provided a slidable release plunger 62b chambered in suitable openings of the hood 83. The inner extremity of plunger 62b engages a depending portion of a blocking bar 62c which is maintained by a spring 62f forwardly together with the sliding plunger 62b. An innermost projection 62d of bar 62c, Figs. 4, 8, and 9, is disposed in the path of a downward projection 62e integrally formed with the aforementioned lever arm 63b, preventing the latter from being rocked downwardly as when actuated by the afore-described mechanical train including trigger 59, plunger 61, etc. Only when the sliding plunger 62b is pushed back as by engagement with the face of a meter, as shown in Fig. 4, are the blocking bar 62c and its projection 62d moved back in opposition to spring 62f, freeing lever arm 63b so as to be responsive to the actuation of the pistol trigger 59.

While the present invention has been explained and illustrated with reference to a specific embodiment, it will be understood that numerous variations and modifications may be instituted without departing from the essential spirit or scope thereof. For this reason, it is not intended that the foregoing detailed specification, nor the illustrations in the accompanying drawings, shall constitute any restriction upon the realm of protection except as indicated by the hereinafter appended claims.

The subject matter claimed is:

1. In a meter-reading camera, means for effecting a focal distance and field alignment with a meter, an exposure shutter, a shutter snapping apparatus, means for positively blocking the actuator of said shutter snapping apparatus, and a mechanism under the control of said distance and field alignment means for withholding said blocking apparatus.

2. In a camera for photographing meters, a lens system, means for supporting a roll of film, comprising a pair of supporting rolls spaced to afford an intermediate plane disposition of said film, apparatus for advancing measured lengths of the film, a shutter control means for actuating said shutter including an alignment test fixture, and intercontrol apparatus responsive to said test fixture and said shutter for positively preventing the operation of said advancing means until said fixture and said shutter have been operated.

3. In a photographic system, a portable housing defining the distances between a photographic lens system and a fixed range object and that between said lens and an image recording plane, aligning means associated with said housing cooperable with aligning means associated with the object, an exposure shutter normally precluded from operating, an electric lighting system contained within said housing for illuminating the object, and a shutter operating device conditioned by the placement of said housing with respect to an object and upon the cooperation of said aligning means of said housing and the object for releasing said shutter and for actuating said lighting system.

4. In a photograph camera system, a housing containing a film supply magazine, an exposure shutter normally precluded from operating, and an object illuminating light, a set of alignment projections on said housing for determining the transverse placement of an object with respect to said housing, and a conditioning apparatus for enabling the operation of said shutter and said light under the control of the planar placement of an object with respect to said housing and the proper positioning of said set of aligning projections.

5. In a photographic camera focused to a fixed distance object plane, a member occupying a part of said plane and attached to said camera, elements carried by said member and adjustable to different positions to represent accordingly variable information in coded form, and means to locate an independent member in said plane having variable positionable elements to represent other information in coded form so that the two sets of positionable elements occupy a predetermined relation to one another.

6. In a portable photographic camera, an exposure shutter, a pistol grip handle, a trigger in said handle, means to release said shutter when said trigger is released, means to block the operation of said trigger, and means to release said blocking means when the object to be photographed is in the object plane of the camera and said camera is properly positioned with respect to said object, whereby said release means engages and is actuated by said object.

7. In a photographic camera, a shutter, means to operate said shutter, a housing defining the distance between said shutter and an object to be photographed, an illuminating system within said housing, and means secured to said housing to prevent the operation of said illuminating system and said shutter operating means except when said housing is placed in the correct planar location with respect to the object and also at the correct distance from the object whereby said means secured to said housing engages and is actuated by the object to be photographed.

8. In a camera for photographing an external object substantially in one plane, a member attached to the camera and occupying part of the object plane, a shutter, means to operate said shutter, means to block said shutter operating means, and means secured to said camera to disable said blocking means operating only when said member attached to the camera is positioned in substantially the same plane as the plane of the external object whereby said means secured to said camera engages and is actuated by the external object to be photographed.

9. In a camera for photographing external objects, a shutter, a film advancing means, shutter operating means, means to block said shutter operating means except when the film is correctly positioned, means to prevent further film advancement until the shutter has been operated, and means secured to said camera to prevent the operation of said shutter operating means except when the camera has been placed in a predetermined relation with respect to the object to be photographed whereby said means secured to said camera engages and is actuated by said external object.

10. In a photographic camera, a shutter-lens unit, an actuating device for said shutter-lens unit, a housing defining a fixed range distance between an objective plane and said shutter-lens unit, means on said camera for aligning said housing with a planar objective comprising dowel pins cooperative with sockets associated with the object to be photographed to determine radial alignment, and pusher means associated with said camera and actuatable by the object to determine linear placement by precluding actuation of said shutter-lens unit except when said dowel pins are properly positioned in said sockets and said pusher means are actuated by the object to be photographed.

LOUIS M. POTTS.

REFERENCES CITED

The following references are of record in the file of this patent:

UNITED STATES PATENTS

| Number | Name | Date |
|---|---|---|
| 1,139,023 | Folmer | May 11, 1915 |
| 1,260,356 | Folmer | Mar. 26, 1918 |
| 1,553,839 | Smith et al. | Sept. 15, 1925 |
| 1,415,042 | Moore | May 9, 1922 |
| Re. 13,224 | Shaffner | Apr. 4, 1911 |
| 1,963,095 | Petit et al. | June 19, 1934 |
| 2,073,368 | Fitz | Mar. 9, 1937 |
| 2,015,803 | Landrock | Oct. 1, 1935 |
| 2,233,389 | Kende et al. | Feb. 25, 1941 |
| 2,233,390 | Kende et al. | Feb. 25, 1941 |
| 1,223,686 | Frisch | Apr. 24, 1917 |
| 2,104,094 | Nerwin | Jan. 4, 1938 |
| 1,816,290 | Klimis | July 28, 1931 |
| 2,140,050 | Hart | Dec. 13, 1938 |
| 2,284,487 | Hineline | May 26, 1942 |
| 2,232,829 | Ross | Feb. 25, 1941 |

FOREIGN PATENTS

| Number | Country | Date |
|---|---|---|
| 494,527 | Great Britain | Oct. 27, 1938 |